INVENTORS:
EDWARD L. LUSTENADER,
HOWARD F. MAY,

BY *W. C. Crutcher*

THEIR ATTORNEY.

United States Patent Office 3,392,712
Patented July 16, 1968

3,392,712
VORTEX DESUPERHEATER
Edward L. Lustenader and Howard F. May, Schenectady, N.Y., assignors to General Electric Company, a corporation of New York
Filed June 30, 1966, Ser. No. 561,844
3 Claims. (Cl. 122—459)

ABSTRACT OF THE DISCLOSURE

Vapor superheat is controlled with a vortex separator by spraying liquid into the vortex core downstream of vortex-producing vanes using the vortex centrifugal field to provide a portion of the spraying pressure gradient.

---

Figure 1:
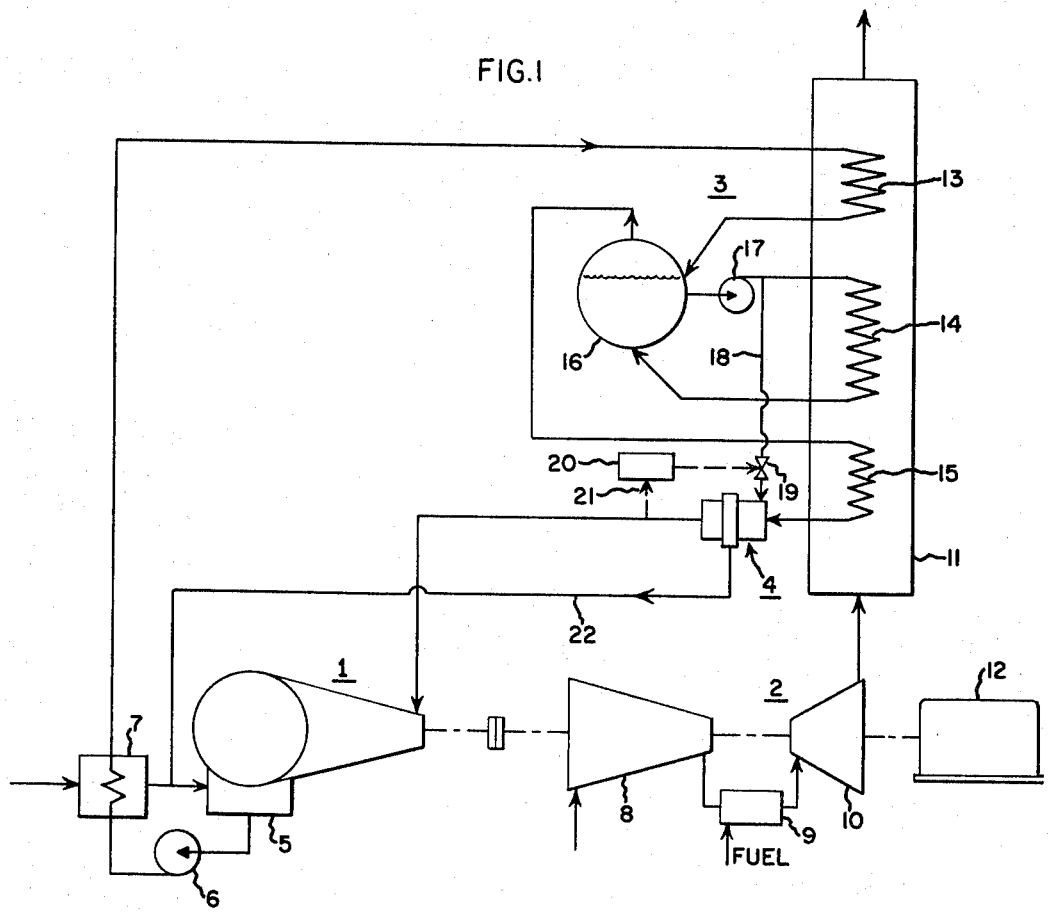

This invention relates to an improved desuperheater using a modified vortex separator to control superheat. More specifically, the invention relates to an improved combined steam and gas turbine cycle providing for control of the superheat in a waste heat steam boiler, despite varying gas turbine exhaust conditions, through the use of a vortex separator in the steam superheat line.

One of the problems encountered in waste heat boiler design providing superheated steam is the difficulty in controlling the temperature and quantity of superheated steam when there are variations in the heat source for the waste heat boiler. The problem is particularly acute in a combined steam/gas turbine cycle where a gas turbine furnishes the exhaust heat to generate superheated steam for the steam turbine. This is because variations in load, ambient temperature, fuel heating value and compressor-turbine characteristics cause the gas turbine exhaust flow and temperature to fail to match the designed conditions of the heat exchange surface in the waste heat boiler. This, in turn, results in the boiler furnishing either too much steam at low superheat or too little steam at high superheat to the steam turbine. Since the boiler often supplies a steam turbine connected with the gas turbine to drive the same load, this may cause still further variation in the gas turbine exhaust conditions.

For this reason, it is desirable to provide a means to control flow rate and temperature of superheated steam to the steam turbine despite variations in the heat source supplying the waste heat boiler.

Vortex separators are known of the type having swirl vanes to impart a centrifugal swirl to a fluid, followed by one or more collection slots at the outer periphery of the separator to remove liquid or solid particles, followed by de-swirl vanes which remove the vortex swirl and return the fluid to substantially its previous pressure distribution with little loss in total pressure head across the device. However, vortex separators have previously been suggested for use where the fluid already contains particles or droplets to be removed. Suggestions have been made for introducing a liquid spray into a centrifugal separator ahead of the swirl vanes for the purpose of entraining or wetting solid particles to be removed. Here, however, the water spray is added to improve solid particle separation rather than to control the condition of the fluid itself.

Accordingly, one object of the present invention is to provide an improved means for controlling vapor superheat by means of a modified vortex separator.

Another object of the invention is to provide an improved desuperheater which introduces liquid spray into a superheated vapor without causing significant pressure drop in the superheated vapor and without requiring an additional pump to supply the liquid spray.

Still another object of the invention is to provide a simple means of controlling superheat in a combined steam/gas turbine cycle.

Figure 2:
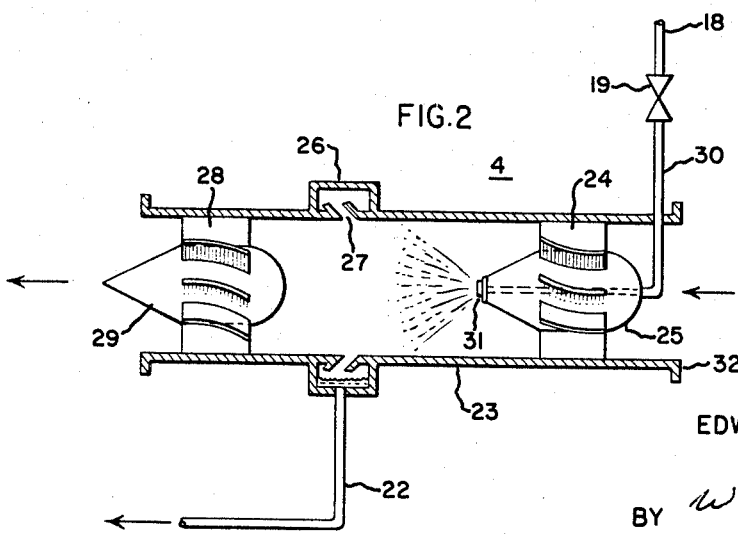

The subject matter of the invention is particularly pointed out and distinctly claimed in the concluding portion of the specification. The invention, however, both as to organization and method of practice, together with further objects and advantages thereof, may best be understood by reference to the following description taken in connection with the accompanying drawing in which:

FIG. 1 is a simplified schematic view of a combined steam/gas turbine cycle using a modified vortex separator to control the superheat, and FIG. 2 is a simplified view, partly in cross section, of a vortex separator modified to act as a desuperheater in accordance with the present invention.

Briefly stated, the invention is practiced by passing superheated vapor through a vortex separator having swirl vanes, collecting slot, and de-swirl vanes. Liquid is introduced into the core of the vortex between the swirl vanes and the collecting chamber, the pressure gradient due to the centrifugal field providing a substantial portion of the pressure gradient required to spray the liquid. Unevaporated excess liquid droplets are removed by the collecting chamber.

Referring now to FIG. 1 of the drawing, a combined cycle includes a steam turbine 1, a gas turbine 2, a heat recovery system 3, and a vortex desuperheater 4.

Steam turbine 1 receives steam from vortex desuperheater 4 which is expanded, condensed and collected in hot well 5. Boiler feed pump 6 pumps the feedwater through a heat exchanger 7, which serves to heat boiler makeup water being supplied to the hot well 5.

Gas turbine 2 comprises a compressor 8, combustion chamber 9, and turbine 10, connected to discharge hot gas through a heat recovery duct 11 to the atmosphere. Steam turbine 1 and gas turbine 2 may be coupled in tandem as shown to drive a load, such as a generator 12, or they may supply separate loads.

The heat recovery unit 3 includes an economizer section 13, an evaporator section 14, and a superheater section 15 all disposed in duct 11. A simple single steam pressure heat recovery unit is employed for purposes of illustration but it will be understood that a dual steam pressure heat recovery unit might also be employed. Heat exchange elements 13, 14, 15 are preferably of the extended surface type such as horizontal rows of finned tubing.

Economizer 13 supplies heated feedwater to a steam drum 16, which is then pumped at a high re-circulation rate through the evaporator section 14 by means of re-circulation pump 17 to return to the drum 16. Saturated steam from the drum is superheated in heat exchange section 15 and flows through the vortex desuperheater 4 to the inlet of steam turbine 1.

In accordance with the invention, a conduit 18 is connected between the outlet of recirculating pump 17 and vortex desuperheater 4, in order to introduce liquid into the desuperheater. In lieu of the connection shown in FIG. 1, conduit 18 can also be conveniently connected to the bottom of steam drum 16 to obtain liquid at a slightly lower pressure (due to the pressure drop in the heat exchange tubes 14). An automatic valve 19 operated by a controller 20 controls the amount of liquid admitted through conduit 18 into vortex desuperheater 4 in accordance with the conditions of steam in the superheat line as indicated at 21. Excess liquid collected in the vortex desuperheater 4 is returned to the boiler feed makeup line via conduit 22.

Reference to FIG. 2 of the drawing illustrates in more detail the arrangement of vortex desuperheater 4. A cylindrical pressure casing 23 is connected at its inlet end 32 to receive superheated steam from heat exchanger 15, while the outlet of casing 23 is connected by a suitable conduit with the inlet of steam turbine 1. The vortex desuperheater consists of a circumferentially spaced set of radial swirl vanes 24 connected between a central streamlined flow guiding member 25 and the casing wall. Swirl vanes 24 impart a strong centrifugal vortex to fluid entering inlet 32, such that there exists a substantial radial pressure gradient ranging from a low pressure at the core of the vortex on the axis of casing 23 to a high pressure at the outer walls of casing 23, as is known in the art.

An annular collecting chamber 26 is disposed downstream of swirl vanes 24 surrounding a collection slot 27 in the casing wall.

De-swirl vanes 28 are similarly mounted on a contoured flow guiding member 29 except that they are curved in the opposite direction so as to substantially straighten the flow and remove the aforesaid radial pressure gradient existing in the fluid between the swirl vanes and the de-swirl vanes. The total effect of the foregoing arrangement is that the overall pressure drop through casing 23 is very small, perhaps on the order of one quarter to one velocity head, while the steam flows therethrough at high velocity. On the other hand, there exists a substantial pressure gradient in a radial direction between the vortex core and the vortex periphery in the casing between vanes 24, 28. The centrifugal field serves to effect collection of liquid or solid particles by throwing them to the outer wall where they pass through slot 27 to collecting chamber 26.

The description thus far relates to a known type of vortex separator structure. An example of the known aspects can be had by reference to the structure disclosed in copending application Ser. 547,697 filed in the name of E. L. Lustenader on Apr. 7, 1966. Improvements in extraction efficiency without excessive loss to the cycle of steam bled through the collection slot 27 can also be obtained by employing a secondary separator to receive the extracted mixture from annular collecting chamber 26 and recirculating the dry vapor portion back into the vortex core as described in copending application Ser. No. 552,120 filed in the name of E. H. Miller on May 23, 1966.

In accordance with the present invention, a conduit 30 conducts liquid supplied through line 18 to a liquid spray nozzle 31 disposed on the flow guiding member 25 at the axis of casing 23. The outlet of nozzle 31 is located downstream of the swirl vanes 24 so as to be located in the centrifugal field, but upstream of the slot 27 so that excess spray droplets can be collected in collection chamber 26 and removed through conduit 22.

The operation of the improved vortex desuperheater is as follows. Referring first to FIG. 1, excess superheat temperature sensed at 21 causes controller 20 to open valve 19 wider to admit more liquid from conduit 18 into conduit 30. The liquid pressure in line 18 is higher than the superheated steam pressure at the inlet to casing 23 because of the pressure drop in heat exchanger elements 14, 15. However, a substantial pressure gradient for spraying liquid through nozzle 31 is obtained because of the centrifugal field in the vortex. The pressure at the casing wall between vanes 24, 28 is substantially the same as that at the inlet 32. However, the core pressure at the location of the nozzle 31 is much lower due to the radial pressure gradient. This gives a total combined pressure head across the spray nozzle equal to the pressure drop through the heat exchange tubes 14, 15 plus the pressure difference between vortex core and vortex periphery. The combined pressure difference is more than sufficient to provide a suitable spraying of liquid into the superheated steam.

The sprayed liquid flashes and serves to reduce the temperature of the superheated steam as well as to increase the total mass flow of superheated steam. Any excess unevaporated droplets are collected through slot 27 and returned to the steam turbine hot well via conduit 22.

The reverse action takes place if too much superheated steam is being supplied at too low a temperature. A lower temperature at the outlet of desuperheater 4 causes the controller 20 to reduce the opening of valve 19, which reduces the amount of liquid sprayed into the vortex core, thereby allowing the steam temperature to increase and decreasing the flow rate.

As mentioned previously, the radial pressure gradient aids greatly in providing sufficient spray nozzle head thereby generally obviating the need for an extra pump to provide the spraying, although of course a pump in line 18 could be employed in some cases. Although conduit 18 is shown connected to the outlet of re-circulating pump 17, this is only a matter of convenience since the type of heat exchanger employed already uses a recirculating pump. Conduit 18 could also be connected directly to the bottom of steam drum 16 and in this case, the spray nozzle pressure head would be provided by an amount equal to the pressure drop through the superheater tubes plus the pressure gradient due to the centrifugal field as explained previously.

The invention is particularly useful as a desuperheater, since very little total pressure head is lost when passing through casing 23. Moreover the novel location of introducing liquid so that the pressure gradient inherent in the separator provides a self-pumping action makes this a very simple means of controlling superheat.

The invention is by no means limited to use in a combined steam/gas turbine cycle but may be used to control the superheat of vapor from any source subject to variations by merely bypassing a portion of the unevaporated fluid and introducing it as shown in FIG. 2. Mixtures of evaporated and unevaporated fluid can also be introduced, the degree of desuperheating varying with the proportions of vapor and liquid.

While it has been shown what is considered to be the preferred embodiment of the invention, other modifications will occur to those skilled in the art. It is, of course, intended to cover in the appended claims all such modifications as fall within the true spirit and scope of the invention.

What we claim as new and desire to secure by Letters Patent of the United States, is:

1. A vortex desuperheater for a system including heat exchanger means for evaporating a liquid and superheating the vapor therefrom, said desuperheater comprising:
   a vortex separator having a cylindrical casing connected to receive superheated vapor from the heat exchanger means and including swirl vanes for imparting centrifugal vortex flow to the vapor, a circumferential collecting slot in the casing wall downstream from the swirl vanes, and de-swirl vanes downstream from the collecting slot for straightening the flow, and
   conduit means connected to a liquid source and constructed and arranged to introduce a liquid spray into the separator between the swirl vanes and the collecting slot,
   whereby the evaporation of the liquid controls the temperature of the superheated vapor while the collecting slot removes unevaporated liquid from the vapor.

2. The combination according to claim 1 wherein said conduit means includes a spray nozzle disposed substantially at the core of the vortex between said swirl vanes and collecting slot so as to direct the spray downstream and toward the casing wall whereby the radial pressure gradient in the separator assists in causing liquid to flow through said conduit means.

3. The combination according to claim 1 wherein said conduit means includes a valve controlling the flow of liquid into the vortex in response to a desired superheated condition of said vapor leaving the desuperheater.

References Cited

UNITED STATES PATENTS

| | | | |
|---|---|---|---|
| 1,965,595 | 7/1934 | Jacobus | 122—459 |
| 2,409,088 | 10/1946 | Weits et al. | 55—238 |
| 2,550,683 | 5/1951 | Fletcher et al. | 122—479 XR |
| 3,177,659 | 4/1965 | Berman | 122—7 XR |

FOREIGN PATENTS 935,462  8/1963  Great Britain.

KENNETH W. SPRAGUE, *Primary Examiner.*